(12) United States Patent
Dhandu et al.

(10) Patent No.: US 10,812,328 B2
(45) Date of Patent: Oct. 20, 2020

(54) NETWORK FUNCTION VIRTUALISATION

(71) Applicant: Telefonaktiebolaget LM Ericsson (publ), Stockholm (SE)

(72) Inventors: Prudhvi Dhandu, County Westmeach (IE); Kandhasamy Narayanan Premnath, County Westmeath (IE); Sven Van Der Meer, County Westmeath (IE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 166 days.

(21) Appl. No.: 15/578,335

(22) PCT Filed: Jun. 3, 2015

(86) PCT No.: PCT/EP2015/062445
§ 371 (c)(1),
(2) Date: Nov. 30, 2017

(87) PCT Pub. No.: WO2016/192794
PCT Pub. Date: Dec. 8, 2016

(65) Prior Publication Data
US 2018/0152347 A1    May 31, 2018

(51) Int. Cl.
*H04L 12/24* (2006.01)
(52) U.S. Cl.
CPC ...... *H04L 41/0816* (2013.01); *H04L 41/0843* (2013.01); *H04L 41/0853* (2013.01); *H04L 41/0873* (2013.01); *H04L 41/0896* (2013.01)
(58) Field of Classification Search
CPC ............. H04L 41/0816; H04L 41/0843; H04L 41/0853; H04L 41/0873; H04L 41/0896
(Continued)

(56) References Cited

U.S. PATENT DOCUMENTS 8,166,477 B1 * 4/2012 Tormasov ............. G06F 9/4418
718/1
2012/0303971 A1 * 11/2012 Palka .................... G06F 21/562
713/189

(Continued)

FOREIGN PATENT DOCUMENTS

WO      WO2015126430      * 8/2015 ............. H04L 12/24

OTHER PUBLICATIONS

International Search Report for International application No. PCT/EP2015/062445—dated Feb. 3, 2016.
(Continued)

*Primary Examiner* — Philip C Lee
(74) *Attorney, Agent, or Firm* — Patent Portfolio Builders, PLLC

(57) ABSTRACT

A first virtual network function (VNF1, 51) in a communications network (5) is activated to operate in accordance with a configuration defined in a configuration file (21). It is determined when the first virtual network function (51) is required to change from an active state to a sleep state. A sleep state configuration file (31) is stored for the first virtual network function (51) at a network management system (10). A change of network conditions is detected in the network. The sleep state configuration file (31) of the first virtual network function (51) is updated in response to the detected change of network conditions while the first virtual network function (51) is in the sleep state. Detecting a change of network conditions in the network can comprise detecting a change to another virtual network function (52, 53, 54) active in the network, or another virtual network function (52) in the sleep state, which impacts the configuration (21) of the first virtual network function (51).

18 Claims, 11 Drawing Sheets

(58) Field of Classification Search
USPC .......................................................... 709/221
See application file for complete search history.

(56) References Cited

U.S. PATENT DOCUMENTS

2014/0280800 A1* 9/2014 Verchere ............. H04L 41/0813
709/221
2014/0317261 A1 10/2014 Shatzkamer et al.
2016/0335111 A1* 11/2016 Bruun ................. G06F 9/45558

OTHER PUBLICATIONS

ETSI GS NFV-MAN 001 v1.1.1; Group Specification; Network Functions Virtualisation (NFV); Management and Orchestration—Dec. 2014.
ETSI GS NFV 002 v1,1.1; Group Specification; Network Functions Virtualisation (NFV); Architectural Framework—Oct. 2013.
European Office Action issued in corresponding EP Application No. 15727952.2; dated Oct. 29, 2018; 05 Pages.

* cited by examiner

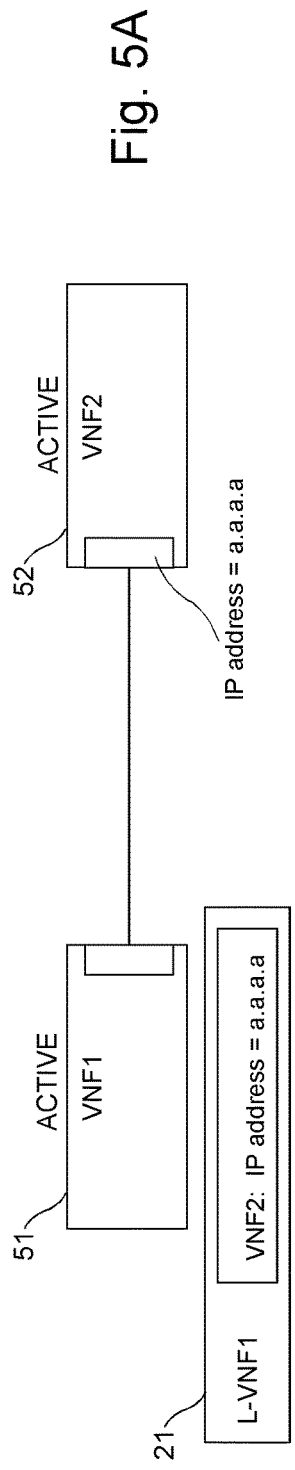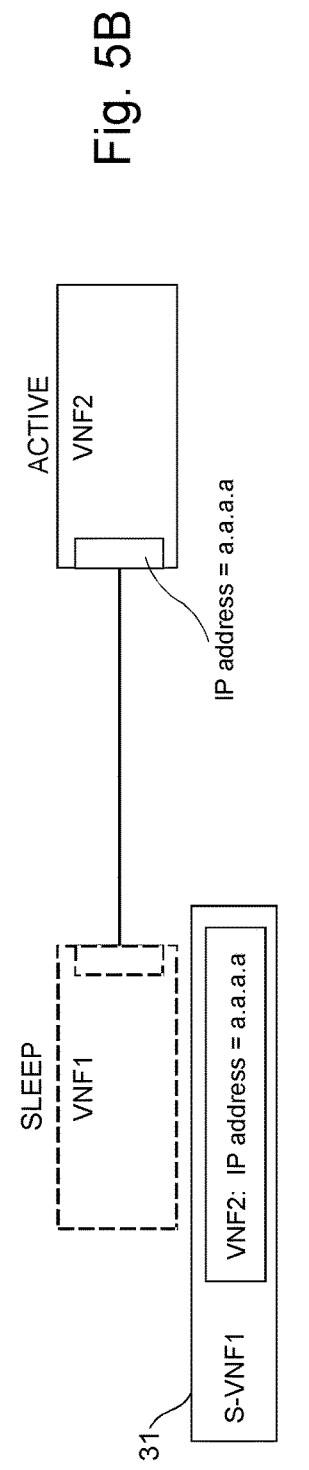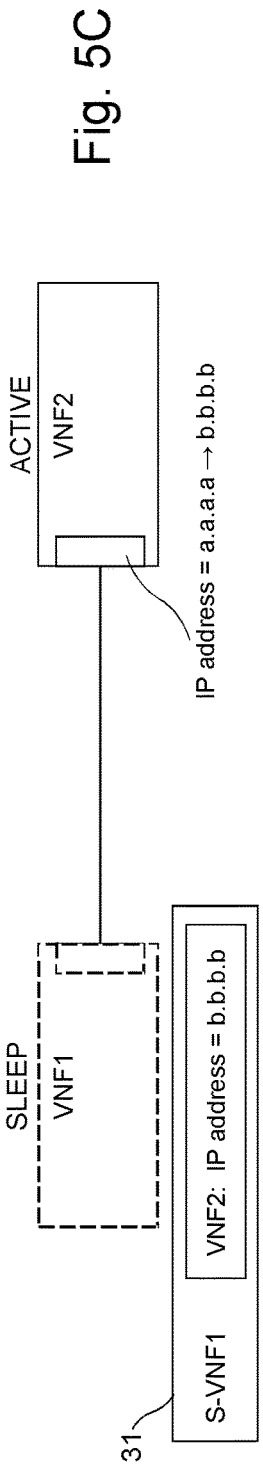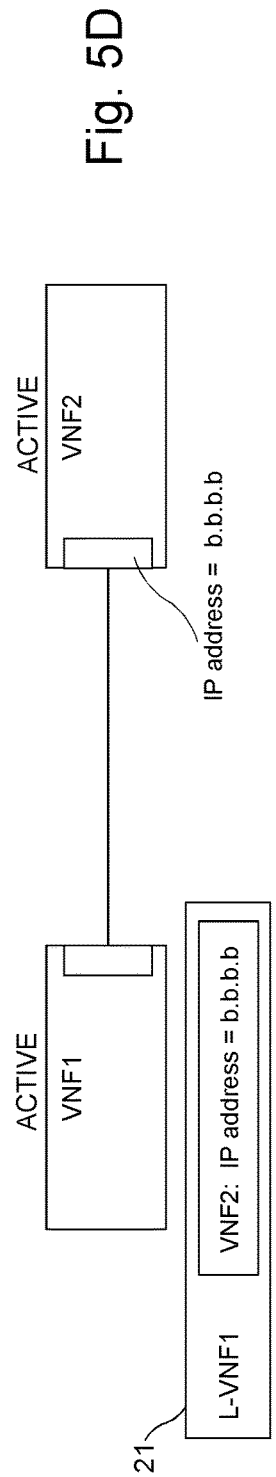

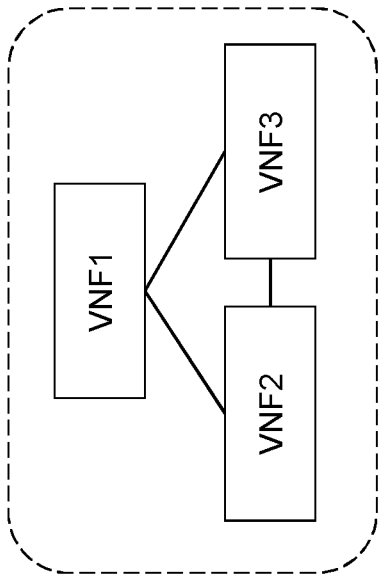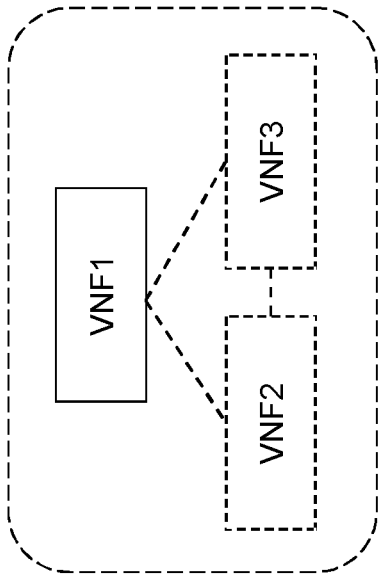
Fig. 8
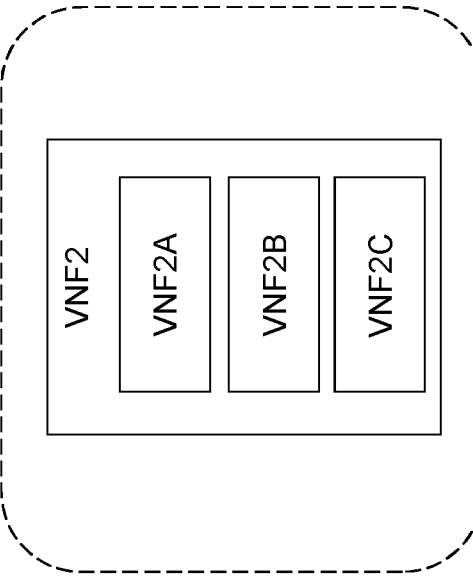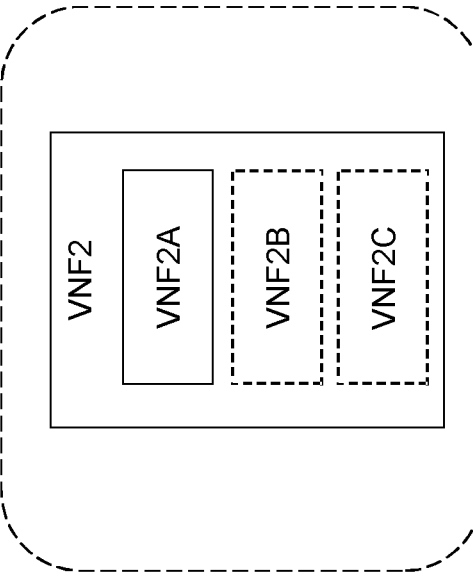
Fig. 9

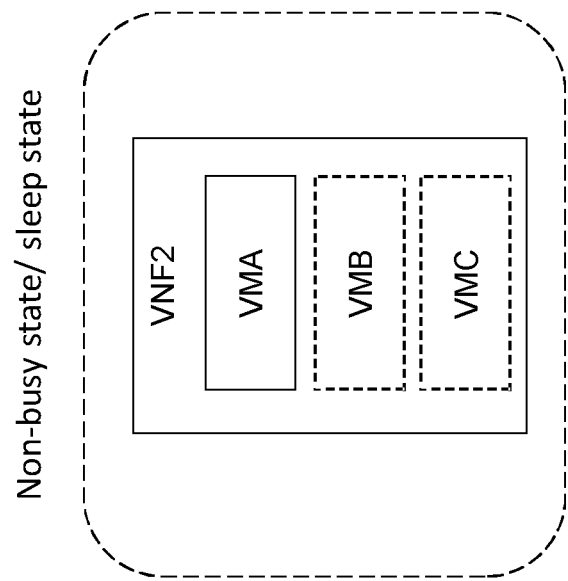
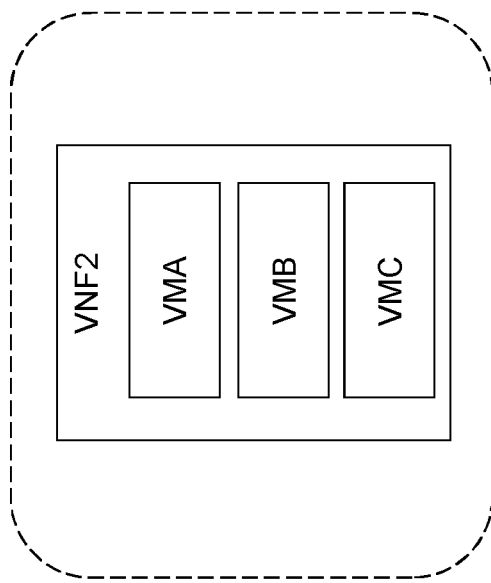
Fig. 10

NETWORK FUNCTION VIRTUALISATION

PRIORITY

This nonprovisional application is a U.S. National Stage Filing under 35 U.S.C. § 371 of International Patent Application Serial No. PCT/EP2015/062445 filed Jun. 3, 2015, and entitled "NETWORK FUNCTION VIRTUALISATION."

TECHNICAL FIELD

The present disclosure is generally related to Network Function Virtualisation.

BACKGROUND

There is interest in migrating telecommunications networks towards cloud-based solutions using Network Function Virtualisation (NFV).

Conventional, non-virtualised, telecommunications networks comprise network nodes, or network elements, with each network node comprising a tightly bound combination of hardware and software which together implement some network function (NF).

Network Function Virtualisation (NFV) is a process in which a logical representation of an underlying physical network, or networks, is created. Such a logical (or virtual) network is decoupled from hardware and software of the underlying physical network resources. By creating a virtual network it is possible to simulate the hardware network resources by running specialised software on general hardware. For example, a switch or a router can be simulated on a general purpose computer that is equipped with ports for connecting physical links. All the functionality of the device is separated from the hardware and simulated as a "virtual instance". In such a virtual switch or router the hardware part is responsible for receiving packets and forwarding these packets towards their destination, but it is the software in the virtual network of a number of these switches or routers that allows for deploying and management of services and underlying network resources.

The European Telecommunications Standards Institute (ETSI) is currently considering network management aspects of NFV networks. ETSI Group Specification GS NFV-MAN 001 (v1.1.1, December 2014) "Network Functions Virtualisation (NFV); Management and Orchestration" describes an NFV Management and Orchestration Architecture (MANO).

One aspect of NFV networks is an ability to dynamically vary the resources provided in a network. This can allow a scaling of network resources at times of increased demand and of reduced demand.

While virtualisation of network functions has benefits, the dynamic nature of such networks and the distribution of network functions across multiple locations and vendors can also increase the amount of co-ordination required to ensure smooth operation of network functions.

SUMMARY

An aspect provides a method of operating a first virtual network function in a communications network. The method comprises activating the first virtual network function to operate in accordance with a configuration defined in a configuration file. The method comprises determining when the first virtual network function is required to change from an active state to a sleep state. The method comprises storing a sleep state configuration file for the first virtual network function at a network management system. The method comprises detecting a change of network conditions in the network. The method comprises updating the sleep state configuration file of the first virtual network function in response to the detected change of network conditions while the first virtual network function is in the sleep state.

Detecting a change of network conditions in the network may comprise detecting a change to another virtual network function active in the network which impacts the configuration of the first virtual network function.

Detecting a change of network conditions in the network may comprise detecting a change to a configuration of another virtual network function in the sleep state which impacts the configuration of the first virtual network function.

Detecting a change of network conditions in the network may comprise detecting a conflict between the configuration of the first virtual network function and another virtual network function; resolving the conflict; and performing the updating of the sleep state configuration file with a valid network configuration.

The method may further comprise storing a list of parameters which could impact the configuration of the first virtual network function; and detecting when a change occurs to one of the parameters in the list.

The configuration can comprise at least one of: a parameter value for the virtual network function; and an IP address for the virtual network function.

Determining when the first virtual network function in the network requires a change from an active state to a sleep state may comprise receiving a notification from a virtual network function manager.

The method may further comprise determining when the first virtual network function is required to change from the sleep state to the active state; and using a configuration file for the first virtual network function based on the updated sleep state configuration file.

The method may further comprise testing the updated sleep state configuration file before using it with the first virtual network function.

The method may further comprise that using a configuration file for the first virtual network function based on the updated sleep state configuration file occurs before the first virtual network function changes to the active state.

The method may further comprise that storing the sleep state configuration file at a network management system occurs before the first virtual network function changes to the sleep state.

Storing the sleep state configuration file of the first virtual network function at a network management system may comprise one of: storing a copy of the configuration file of the first virtual network function at the network management system; and moving the configuration file of the first virtual network function to a sleep state configuration store of the network management system.

Another aspect provides apparatus comprising a processor and a memory, the memory containing instructions executable by the processor whereby the processor is operative to activate a first virtual network function to operate in accordance with a configuration defined in a configuration file. The processor is operative to determine when the first virtual network function is required to change from an active state to a sleep state. The processor is operative to store a sleep state configuration file for the first virtual network function at a network management system. The processor is operative to detect a change of network conditions in the network. The processor is operative to update the sleep state configuration file of the first virtual network function in response to the detected change of network conditions while the first virtual network function is in the sleep state.

Another aspect provides network management apparatus comprising a network function virtualisation manager configured to activate a first virtual network function to operate in accordance with a configuration defined in a configuration file and to determine when the first virtual network function is required to change from an active state to a sleep state. The network management apparatus comprises a store configured to store a sleep state configuration file for the first virtual network function. The network management apparatus comprises a configuration integrity management entity configured to detect a change of network conditions in the network and to update the sleep state configuration file of the first virtual network function in response to the detected change of network conditions while the first virtual network function is in the sleep state.

Another aspect provides a communications network comprising a network management apparatus.

The methods described above are particularly useful in scenarios of cyclical expansion and reduction of virtual network functions. Configuration is maintained accurately in the network management system even when the virtual network function is taken out of service. As a result, at the time of redeployment, no network discovery is required to accurately configure the virtual network function. For example, consider an example where indoor wireless base station nodes are taken out of service (turned off) during non-business hours. Conventionally, a network management system either completely removes the nodes from their network model or leave them as hanging node configurations without a valid node active with the configuration. As a result, when the nodes are turned on at the start of the next business day, the network management system has to read a full configuration of the newly turned on node and other nodes have to update their configurations to accommodate the newly turned on node. Because all of this happens spontaneously at the start of morning business hours, network management systems struggle to cope with the load at that time.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

BRIEF DESCRIPTION OF THE DRAWINGS

Embodiments of the invention will be described, by way of example only, with reference to the accompanying drawings in which:

FIGS. 5A to 5D and FIG. 6 show an example of a change to a configuration of a virtual network function;

FIG. 8 shows an example of dynamic changes to a virtual network between a busy state and a non-busy state;

FIG. 9 shows an example of dynamic changes to a virtual network function between a busy state and a non-busy state;

FIG. 10 shows another example of dynamic changes to a virtual network function between a busy state and a non-busy state;

DETAILED DESCRIPTION

Figure 1:
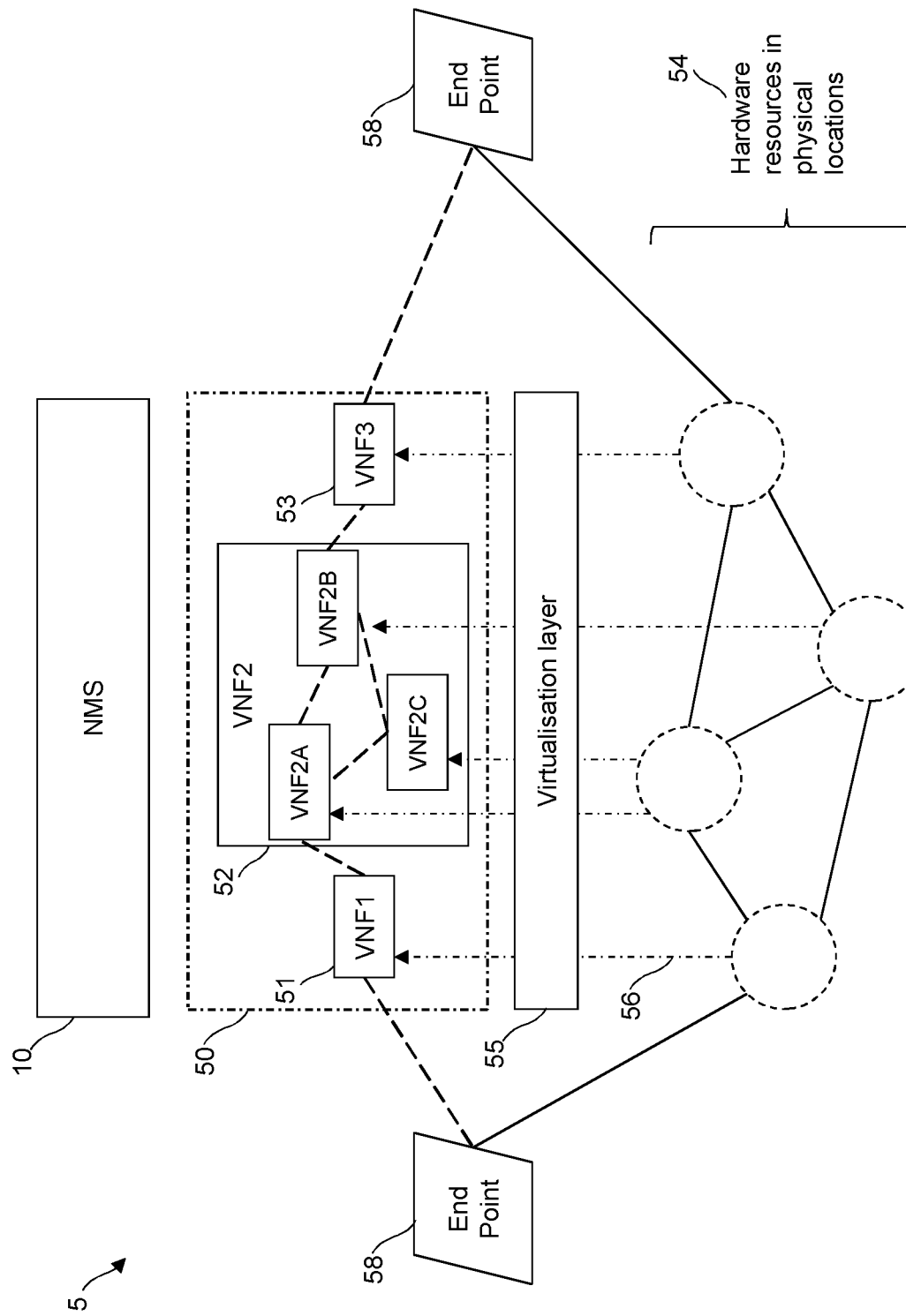
FIG. 1 shows a communications network with network function virtualisation (NFV)

FIG. 1 shows an example of a communications network 5 with network function virtualisation (NFV). The communications network 5 may be a software defined network (SDN). Virtual network functions VNF1 51, VNF2 52 and VNF3 53 are provided in the network. The virtual network functions VNF1-VNF3 are implemented by hardware resources 54 located at physical locations in the network. A virtualisation layer 55 provides a mapping 56 between the virtual network functions VNF1-VNF3 and the virtual resources (e.g. virtual machines, VM) and physical resources 54. A VNF can be implemented by a collection of physical resources in one geographical location, or distributed geographical locations. An end-to-end path between end points 58 of the network 5 follows a logical path between virtual network functions VNF1-VNF3. Box 50 represents a virtualised network function forwarding graph (VNF-FG). A virtual network function can comprise other virtual network functions. In this example, VNF2 comprises virtual network functions VNF2A, VNF2B and VNF2C. Each VNF can use one or more virtual machines (VM) to achieve the required functionality. Advantages of the NFV approach include decoupling software from hardware, flexible network function deployment and dynamic operation. Examples of virtual network functions VNF include: network elements of a 3GPP Evolved Packet Core (EPC) such as a Mobility Management Entity (MME), Serving Gateway (SGW), Packet Data Network Gateway (PGW); elements in a home network such as a residential gateway; and conventional network functions such as a router, wireless base station, Dynamic Host Configuration Protocol (DHCP) server, firewall. A network management system (NMS) 10 is provided for the network 5.

Figure 2:
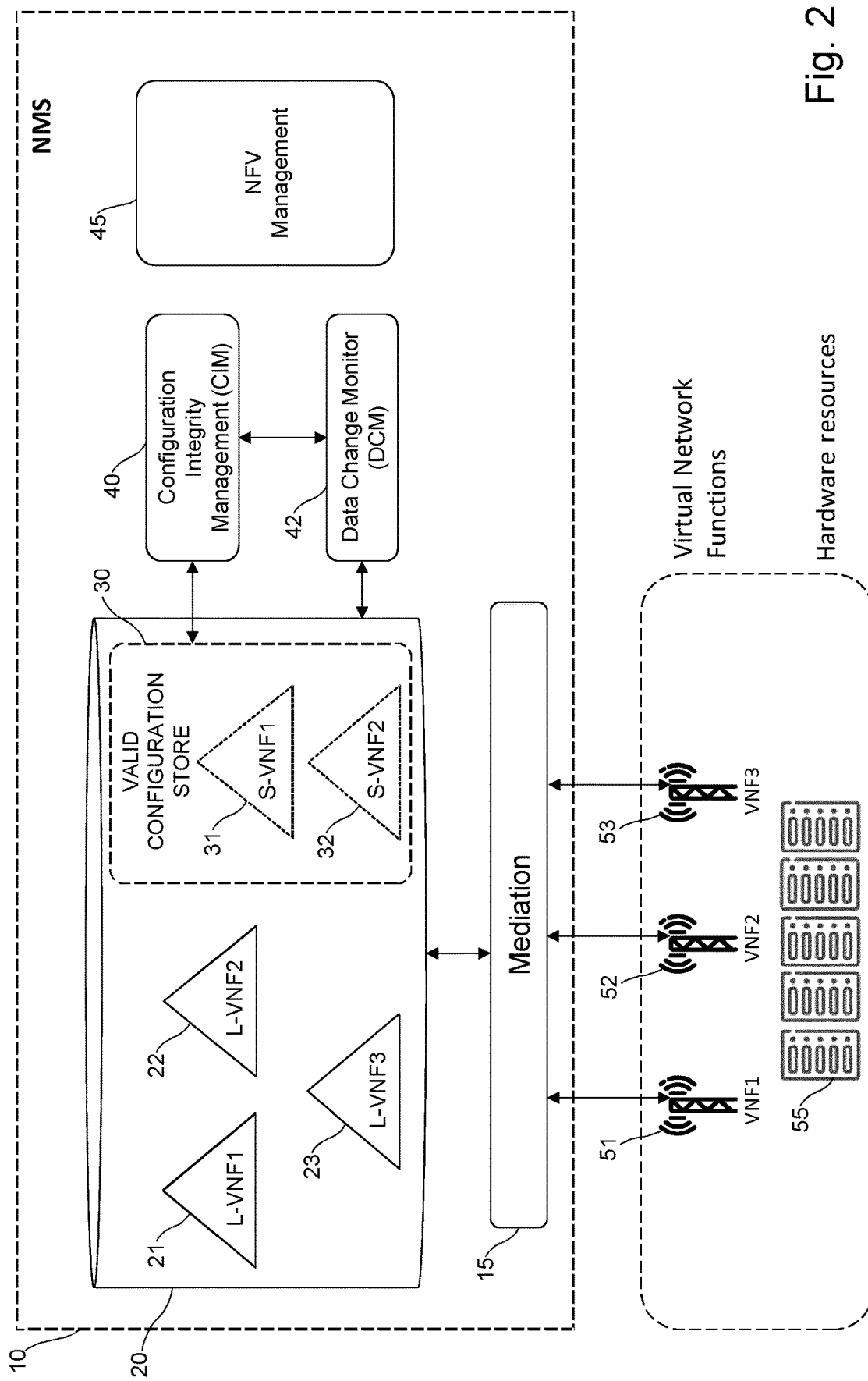
FIG. 2 shows a network management system (NMS) for use with the network of FIG. 1.

FIG. 2 shows the network management system (NMS) 10 in more detail. In this specification, the general term network management system (NMS) is used. The general term NMS can include one or more of: Operations Support System (OSS); Business Support System (BSS); SDN network controller; NFV Management and Orchestration (NFV-MANO).

A NFV management function 45 is configured to dynamically control the VNFs VNF1-VNF3. In accordance with ETSI Group Specification GS NFV-MAN 001 (v1.1.1, December 2014) "Network Functions Virtualisation (NFV); Management and Orchestration", the NFV management function 45 can comprise a VNF manager (VNFM) and a NFV Orchestrator (NFVO). The NFV management function 45 can control the number of resources which are in an active state at any time. This is called scaling. At times of increased demand, additional resources can be brought into active service and at times of reduced demand resources can be removed from active service. This allows the network to match demand, while also allowing power-saving during times of reduced demand. Additional resources can be provided in the network by one or more of: (i) adding or removing resource instances, such as virtual machines (VM) allocated to the VNF; (ii) changing allocated resource e.g. by increasing/decreasing memory, CPU capacity or storage size. The NFV management function 45 may signal when a particular VNF in the set of resources VNF1-VNF3 is required to change to an active state, or when a particular VNF in the set of resources VNF1-VNF3 is required to change to a sleep state.

A store 20 stores a configuration for each virtual network function VNF1-VNF3 which is active in the network. A configuration can be stored as a configuration file 21-23 in the store 20. For example, configuration file L-VNF1 21 corresponds to VNF1 51, L-VNF2 22 corresponds to VNF2 52, and so on. A configuration can comprise configuration data for VNFs such as one or more of: operational state, availability, power consumption, capacity, capacity utilisation, connections to other VNFs, hardware resources, under what specifications they have function, etc. A configuration may include a mapping to other VNFs. A configuration may store configuration data which maps the virtual network functions VNF1-VNF3 to the actual hardware resources 54. The configuration files 21-23 store configuration data such as parameter values for a plurality of parameters of the VNF. For example, a configuration file for a wireless base station may store parameters which indicate frequencies the base station can use, cell identifiers, power levels, capabilities, an IP address of an interface used by the base station etc. The configuration may comprise a set of managed objects (MO) as defined in 3GPP TS 32.600 "3G Configuration Management (CM)".

FIG. 2 also shows a valid configuration store 30. A configuration is stored for a virtual network function during a period when the virtual network function is in a sleep state. The term "hibernation" can be used instead of sleep. For example, when VNF1 51 is controlled to enter a sleep state, a sleep state configuration S-VNF1 31 can be stored in the valid configuration store 30. As will be described in more detail below, the sleep state configuration S-VNF1 31 for VNF1 can be updated during the period while the VNF1 is in the sleep state. Changes continue to occur to the network while VNF1 is in the sleep state. For example, changes can be made to active ones of the other virtual network functions VNF2, VNF3 which have an impact on the operation of VNF1. Consider that VNF1 and VNF2 are adjacent wireless base stations. While VNF1 is in a sleep state an operating frequency of VNF2 is changed. The new operating frequency of VNF2 conflicts with the one previously used by VNF1. This requires a change to the operating frequency of VNF1 to avoid a conflict in operating frequencies. As another example, consider that VNF1 and VNF2 are two functions which communicate with each other. While VNF1 is in a sleep state an IP address of an IO interface of VNF2 is changed. This requires a change to VNF1 to ensure VNF1 can continue to communicate with VNF2. By continuing to update the sleep state configuration S-VNF1 for VNF1 during the period while VNF1 is in the sleep state, VNF1 can be brought back into service with minimal disruption. In FIG. 2 the valid configuration store 30 is shown as part of store 20, but it could be separate from store 20.

FIG. 2 shows a configuration file L-VNF1 for VNF1 and a sleep state configuration file S-VNF1 for VNF1. Typically, only one of these files is present at a particular point in time: either L-VNF1 is present in store 20 while VNF1 is in the active state, or S-VNF1 is present in store 30 while VNF1 is in the sleep state.

One way of implementing the configuration file for the sleep state, S-VNF1, is to make a copy of the current configuration L-VNF1 of VNF1 at the time of entering the sleep state, and store that copy file as file S-VNF1 in store 30. While VNF1 is in the sleep state, changes are made to the file S-VNF1. Another way of implementing the configuration file for the sleep state, S-VNF1, is to move the configuration file L-VNF1 for VNF1 to store 30 at the time of entering the sleep state. The configuration file L-VNF1 becomes S-VNF1. While VNF1 is in the sleep state, changes are made to the file S-VNF1.

A mediation function 15 interfaces between virtual network functions 51-53 and/or hardware resources 55, and any elements in the NMS requiring data from the VNFs and/or hardware resources 55, such as configuration files 21-23 and applications 40, 42. During operation of the network, configuration files 21-23 for VNF1-VNF3 require data about VNFs 51-53 and/or hardware resources 55. The mediation function 15 avoids a need for a large number of elements in the NMS to individually query VNFs and/or hardware resources 55 and read their data. A form of data mirroring can occur as follows:

1. Management system decides what data needs to be mirrored based on needs of the elements in the NMS.
2. Mediation function 15 labels the data that has to be mirrored and subscribes to the VNFs and/or hardware resources 55 requesting to be notified of any changes to that data.
3. Whenever there is a change in that data at the VNF and/or hardware resources, the VNF informs the mediation function 15 of a value change event.
4. Mediation function 15 reads the new value and updates the mirrored data present in the database. Any elements which requested that data are notified.

FIG. 2 shows two further functional units: a Configuration Integrity Management (CIM) function 40 and a Data Change Monitor (DCM) 42. The Configuration Integrity Management (CIM) function 40 is configured to maintain the sleep state configuration S-VNF1 31 for a VNF in an up-to-date state with respect to changes in the network. One function of the CIM 40 is to resolve conflicts between configurations. For example, when an interface address is changed on one VNF, the CIM 40 checks for conflicts with other VNFs which rely on that interface and resolve the conflict by changing the interface address on those other VNFs. The Data Change Monitor (DCM) 42 is configured to receive a notification of a change to any data of configurations in store 30. For example, when VNF1 51 is in the sleep state and a sleep state configuration file S-VNF1 31 is stored in store 30, the DCM 42 is configured to receive a notification of a change to any data which may impact the configuration of VNF1. As described above, DCM 42 can register with the mediation function 15 to be notified of changes to any data which affects VNF1.

The CIM 40 can determine conflicts between parameter values received at the NMS and parameter values in the configurations held in store 30. In effect, it is equal to CIM 40 looking for conflicts between store 20 and store 30 because parameter values received at NMS update store 20. Store 20 is the mirror of actual VNFs that are sending the parameter changes.

In another example, the DCM 42 can be omitted and the Configuration Integrity Management (CIM) function 40 can be configured to directly register with the mediation function 15 to receive notifications of any changes in data used by the configurations in store 30.

Figure 3:
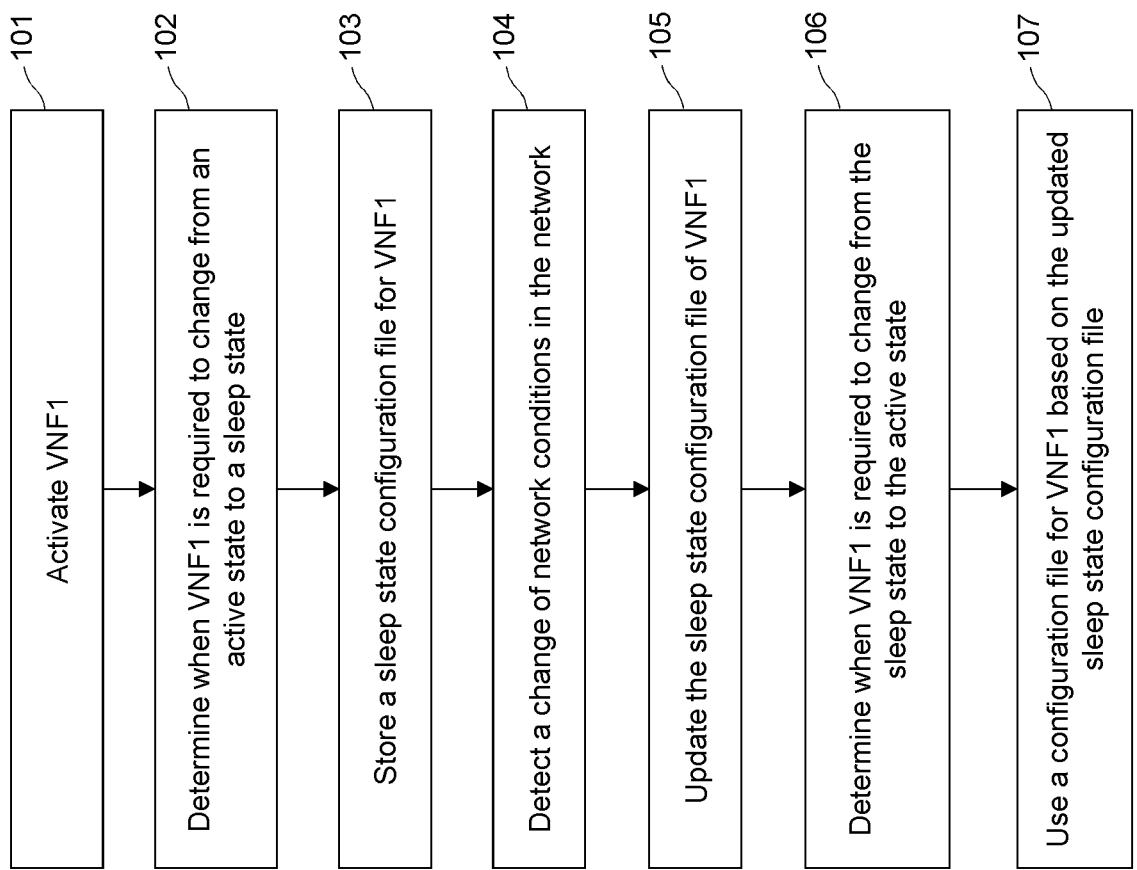
FIG. 3 shows an example method performed by a network management system.

FIG. 3 shows an example method of operating a first virtual network function, VNF1, in the communications network of FIGS. 1 and 2. The method can be performed by the NMS 10. At block 101, the method comprises activating VNF1 to operate in accordance with a configuration defined in a configuration file. At block 102 the method determines when VNF1 is required to change from an active state to a sleep state. At block 103 the method stores a sleep state configuration file for VNF1 at the network management system. At block 104 the method detects a change of network conditions in the network. At block 105 the method updates the sleep state configuration file of VNF1 in response to the detected change of network conditions while VNF1 is in the sleep state. At block 106 the method determines when VNF1 is required to change from the sleep state to the active state. At block 107 the method uses a configuration file for the first virtual network function based on the updated sleep state configuration file. For example, the sleep state configuration file S-VNF1 can be moved to the part of the store 20 which holds the configurations for active VNFs, and the file S-VNF1 renamed as L-VNF1, or a copy of the file S-VNF1 can be used as the file L-VNF1. It will be understood that the method described above in respect of VNF1 can be applied to any of the VNFs.

Figure 4:
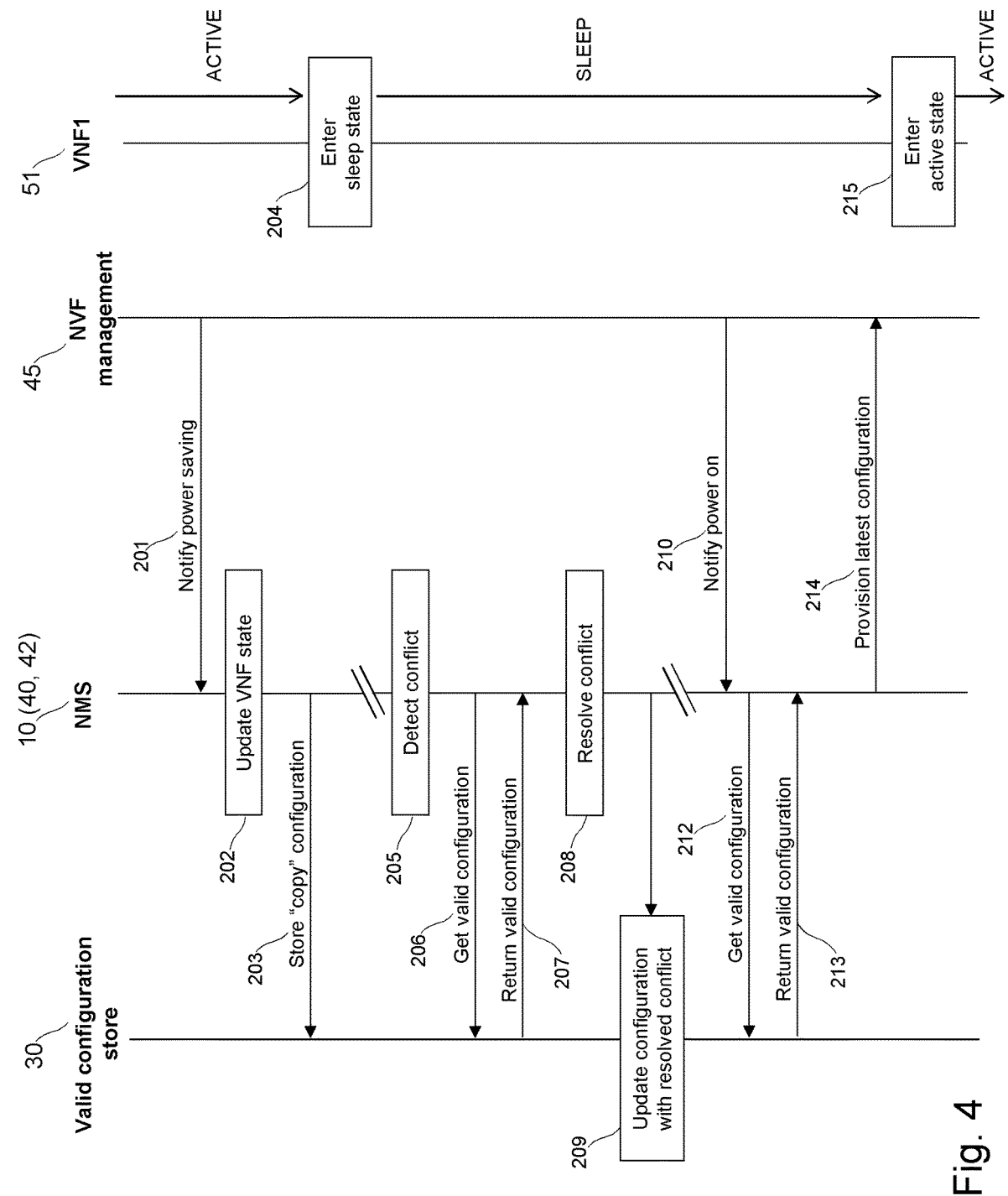
FIG. 4 shows an example method performed by a network management system in more detail.

FIG. 4 shows an example method of operating a first virtual network function, VNF1, in the communications network of FIGS. 1 and 2 in more detail. Initially, a first virtual network function VNF1 51 is operational in the network. VNF1 51 is in an active state and operates in accordance with a configuration defined in a configuration file (e.g. configuration file 21 in store 20, FIG. 2). The method determines when the first virtual network function VNF1 51 is required to change from an active state to a sleep state. In FIG. 4, the NFV management function 45 sends 201 an indication that power saving is required. The NMS updates the VNF state at 202. The NMS stores 203 a sleep state configuration file for VNF1. For example, the NMS stores S-VNF1 in valid configuration store 30. During the period while VNF1 is in the sleep state, the NMS detects a change of network conditions in the network which may affect VNF1 and updates the sleep state of the configuration file in store 30 in response to the detected change of network conditions. This is shown at 205-209. At 205 a conflict is detected. For example, the NMS may detect at 205 that a change has been made to a configuration of another VNF which impacts VNF1. The NMS retrieves 206, 207 the current valid configuration S-VNF1 for VNF1. The NMS resolves the conflict at 208. The NMS updates the configuration S-VNF1 with the result of the resolved conflict at 209. At some later time, VNF1 is required to change to an active state. In FIG. 4, the NFV management function 45 sends 210 an indication that VNF1 is to be powered on. The NMS retrieves 212, 213 the current valid configuration S-VNF1 for VNF1. The NMS provisions 214 the latest configuration for VNF1. For example, the NMS may replace the configuration file 21 for VNF1 with the updated configuration file 31 retrieved from store 30. At 215 VNF1 enters the active state. Because the configuration for VNF1 was updated while VNF1 was at sleep, VNF1 can operate in the network without disrupting other VNFs.

In FIG. 4, the provisioning at 214 of the latest configuration occurs before VNF1 enters the active state. In an alternative example, the provisioning at 214 of the latest configuration can occur as VNF1 enters the active state. In another alternative example, the provisioning at 214 of the latest configuration can occur after VNF1 enters the active state.

In FIG. 4, a copy of the configuration of VNF1 is made before the VNF1 changes to the sleep state. In an alternative example, a copy of the configuration of VNF1 is made as the VNF1 changes to the sleep state. In another alternative example, a copy of the configuration of VNF1 is made after the VNF1 changes to the sleep state. In any of these examples, the configuration file L-VNF1 can be removed (i.e. deleted) from store 20 once VNF1 enters the sleep state as VNF1 is no longer active. In an alternative example, the configuration file L-VNF1 can be moved to store 30 and becomes file S-VNF1 when the VNF1 changes to the sleep state. In this case, there is no need to delete file L-VNF1 as it simply moves to the sleep state store 30.

FIGS. 5A to 5D and FIG. 6 show an example of a change occurring to a VNF, and the subsequent conflict resolution and update of a configuration. FIG. 5A shows a virtual network function VNF1 which is configured to communicate with a virtual network function VNF2. VNF2 has an IP address=a.a.a.a. The configuration L-VNF1 of VNF1 stores the IP address=a.a.a.a as the address it can use to reach VNF2. In FIG. 5A both VNF1 and VNF2 are in an active state. In this active state, VNF1 can send data to VNF2 using the IP address a.a.a.a. At FIG. 5B VNF1 is changed to a sleep state. As described above, a configuration file S-VNF1 for VNF1 is stored in a store 30 by making a copy of L_VNF1, or moving L-VNF1 to store 30. VNF1 does not send data to VNF2 in this sleep state. At FIG. 5C the IP address of VNF2 is changed from a.a.a.a to b.b.b.b. The NMS detects this change and determines that it affects the configuration of VNF1. The configuration S-VNF1 in store 30 for VNF1 is updated to store the new IP address of VNF2 as b.b.b.b. At FIG. 5D VNF1 changes to an active state. The configuration of VNF1 uses the configuration S-VNF1 which was updated while the VNF1 was in the sleep state. Therefore, VNF1 has the correct IP address to reach VNF2 and does not require any further configuring after returning to the active state, and will be able to function immediately.

Figure 6:
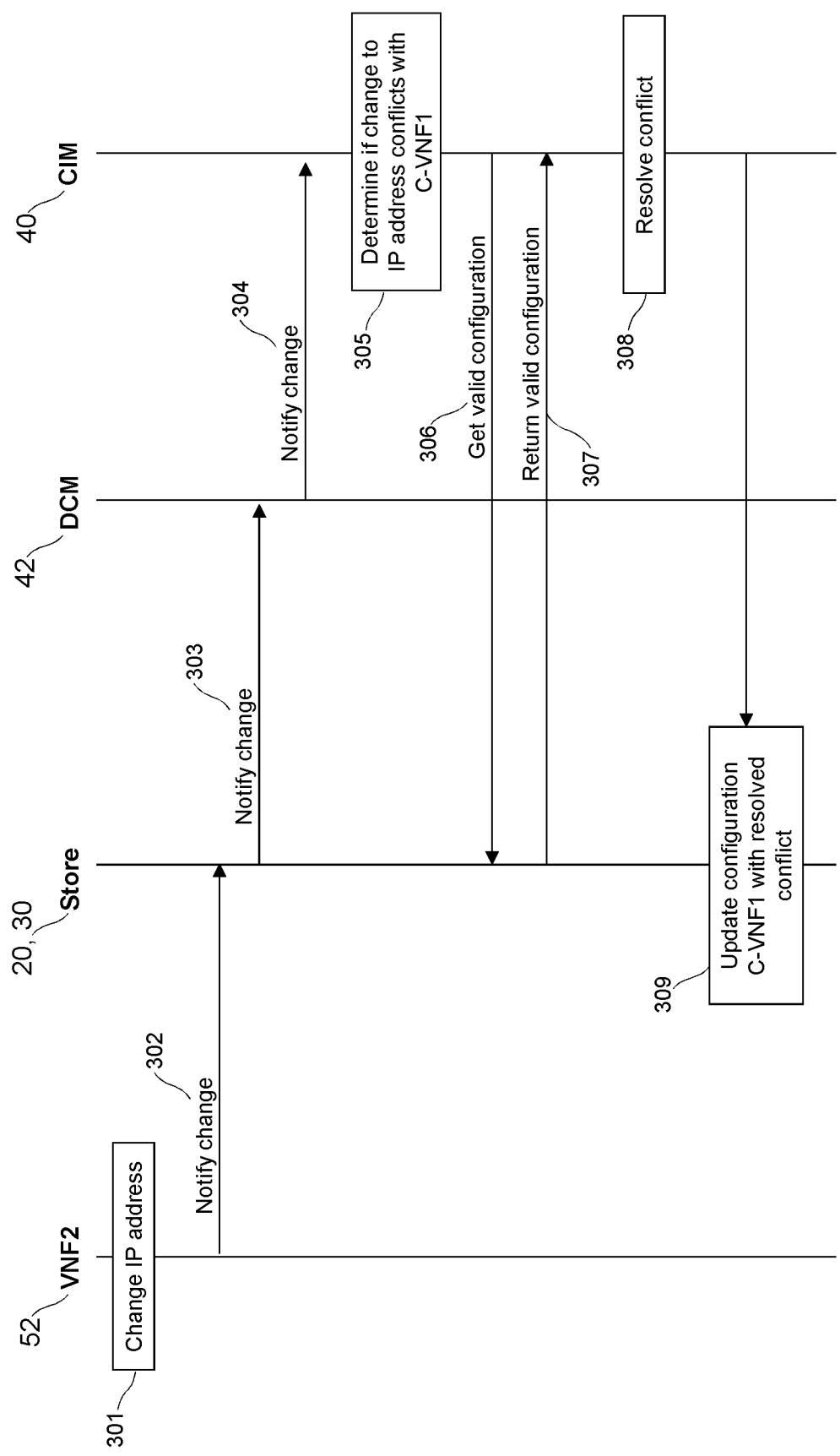

FIG. 6 shows the method corresponding to FIG. 5C. At 301 an IP address used by VNF2 is changed from a.a.a.a to b.b.b.b. The change in IP address is notified to the configuration database 20, the DCM 42 and the CIM 40 at 302-304. At 305, the CIM determines if the change of the IP address at VNF2 from a.a.a.a to b.b.b.b is in conflict with VNF1. CIM 40 retrieves the current valid configuration S-VNF1 at 306, 307. The CIM 40 resolves the conflict at 308, e.g. by changing the IP address that VNF1 uses to contact VNF2 from a.a.a.a to b.b.b.b. At 309 the CIM 40 updates the configuration S-VNF1 in store 30 with the updated configuration. VNF1 will operate correctly when it is returned to an active state and will be able to reach VNF2. Without performing the method of FIG. 6, the configuration of VNF1 will become out-of-date with respect to VNF2 while VNF1 is in the sleep state and, upon returning to the active state, VNF1 will attempt to reach VNF2 using the out-of-date IP address a.a.a.a.

In the example of FIG. 6, a change to VNF2 is notified to DCM 42 and CIM 40. CIM 40 acts upon the notification, detects the conflict, and resolves the conflict. The process can be summarised as: (i) detecting a change of network conditions (i.e. a change in parameter values); (ii) detecting a conflict between the configuration 21 of the virtual network function VNF1 and another virtual network function VNF2, VNF3; (iii) resolving the conflict; and (iv) performing updating of the sleep state configuration file 31 with a valid network configuration.

DCM 42 can detect a change of network conditions by: storing a list of parameters which could impact the configuration 21 of the virtual network function VNF1; and detecting when a change occurs to one of the parameters in the list.

In an alternative approach, a periodic consistency check is performed between (i) the configurations held in store 30 for VNFs in the sleep state and (ii) the configurations held in store 20 for VNFs in the active state. Similar to the method described above, the consistency check detects a change in a configuration of an active VNF which impacts the configuration of a VNF held in store 30. When a conflict is detected it is resolved and the configurations held in store 30 is updated.

Figure 7A:
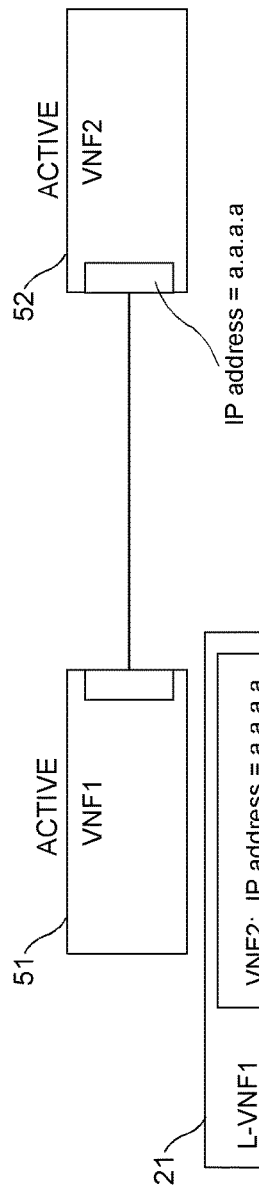
FIGS. 7A to 7D show another example of a change to a configuration of a virtual network function.
Figure 7B:
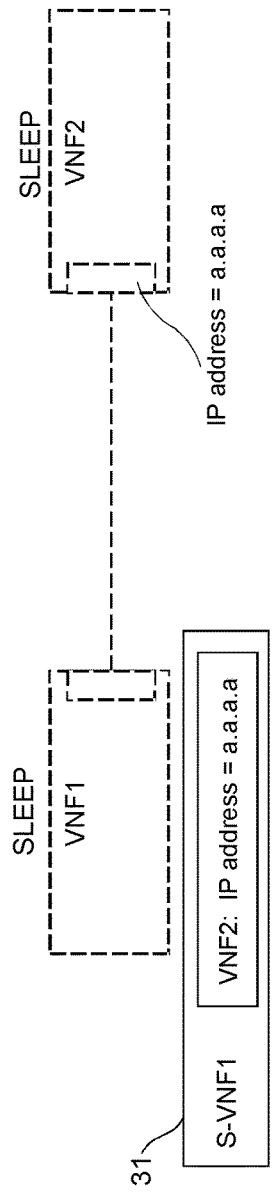
Figure 7C:
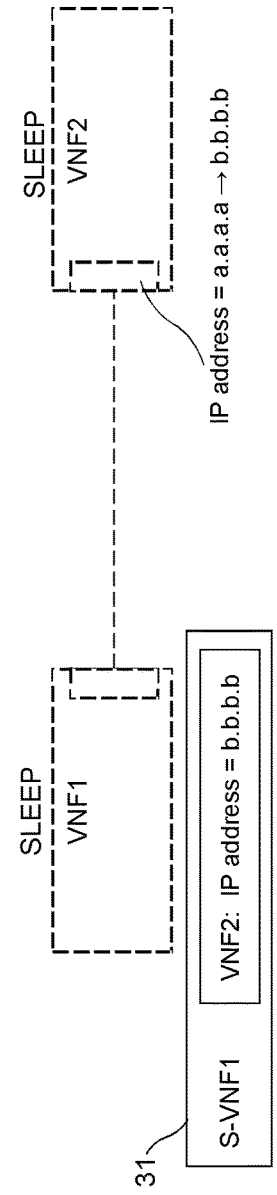
Figure 7D:
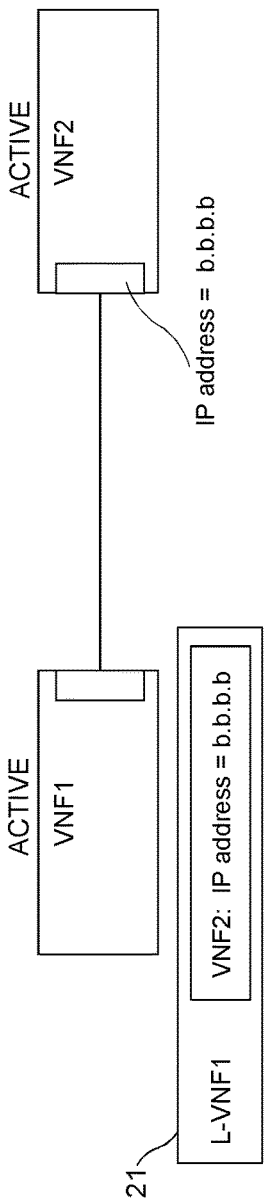

The CIM 40 can also check for conflicts between VNFs in the sleep mode. This is illustrated in FIGS. 7A-7D. FIGS. 7A to 7D show an example of a change occurring to a VNF, and the subsequent conflict resolution and update of a configuration. FIG. 7A shows a virtual network function VNF1 which is configured to communicate with a virtual network function VNF2. VNF2 has an IP address=a.a.a.a. The configuration L-VNF1 of VNF1 stores the IP address=a.a.a.a as the address it can use to reach VNF2. In FIG. 7A both VNF1 and VNF2 are in an active state. In this active state, VNF1 can send data to VNF2 using the IP address a.a.a.a. At FIG. 7B VNF1 and VNF2 are both in a sleep state. VNF1 and VNF2 can change to the sleep state at different times. As described above, a copy S-VNF1 of the configuration of VNF1 is stored in a store 30. VNF1 does not send data to VNF2 in this sleep state. At FIG. 7C the IP address of the at sleep VNF2 is changed from a.a.a.a to b.b.b.b. The NMS detects this change and determines that it affects the configuration of VNF1. The configuration S-VNF1 in store 30 for VNF1 is updated to store the new IP address of VNF2 as b.b.b.b. At some later time, shown in FIG. 7D, both VNF1 and VNF2 are in an active state. The transition of VNF1 and VNF2 to the active state can occur at different times. The configuration of VNF1 uses the configuration S-VNF1 which was updated while the VNF1 was in the sleep state. Therefore, VNF1 has the correct IP address to reach VNF2 and does not require any further configuring after returning to the active state, and will be able to function immediately.

FIGS. 8 and 9 schematically show some possible ways in which resources can be dynamically varied in a virtualised network. FIG. 8 shows a network in a busy state and a non-busy state. In the busy state the network comprises the VNFs VNF1, VNF2 and VNF3. In a non-busy state only a single virtual network function VNF1 is in an active state. VNF2 and VNF3 are in a sleep state. During the non-busy state, the configuration of VNF2 and the configuration of VNF3 remain up-to-date, but traffic is not forwarded between VNF1 and VNF2, or between VNF1 and VNF3.

FIG. 9 shows a VNF in a busy state and a non-busy state. In the busy state the VNF2 comprises the VNFs VNF2A, VNF2B and VNF2C. In a non-busy state only a single virtual network function VNF2A is in an active state. VNF2B and VNF2C are in a sleep state. During the non-busy state, the configuration of VNF2B and VNF2C remain up-to-date, but traffic is not forwarded to/from VNF2B or VNF2C.

FIG. 10 shows a VNF in a busy state and a non-busy state. In the busy state the VNF comprises the virtual machines (VM) VMA, VMB and VMC. In a non-busy state only a single virtual network function VNF2A is in an active state. VMB and VMC are in a sleep state. In a conventional network, no configuration data is stored for a VNF when a VNF is put in the sleep state, and therefore no changes can be made to the configuration data.

Figure 11:
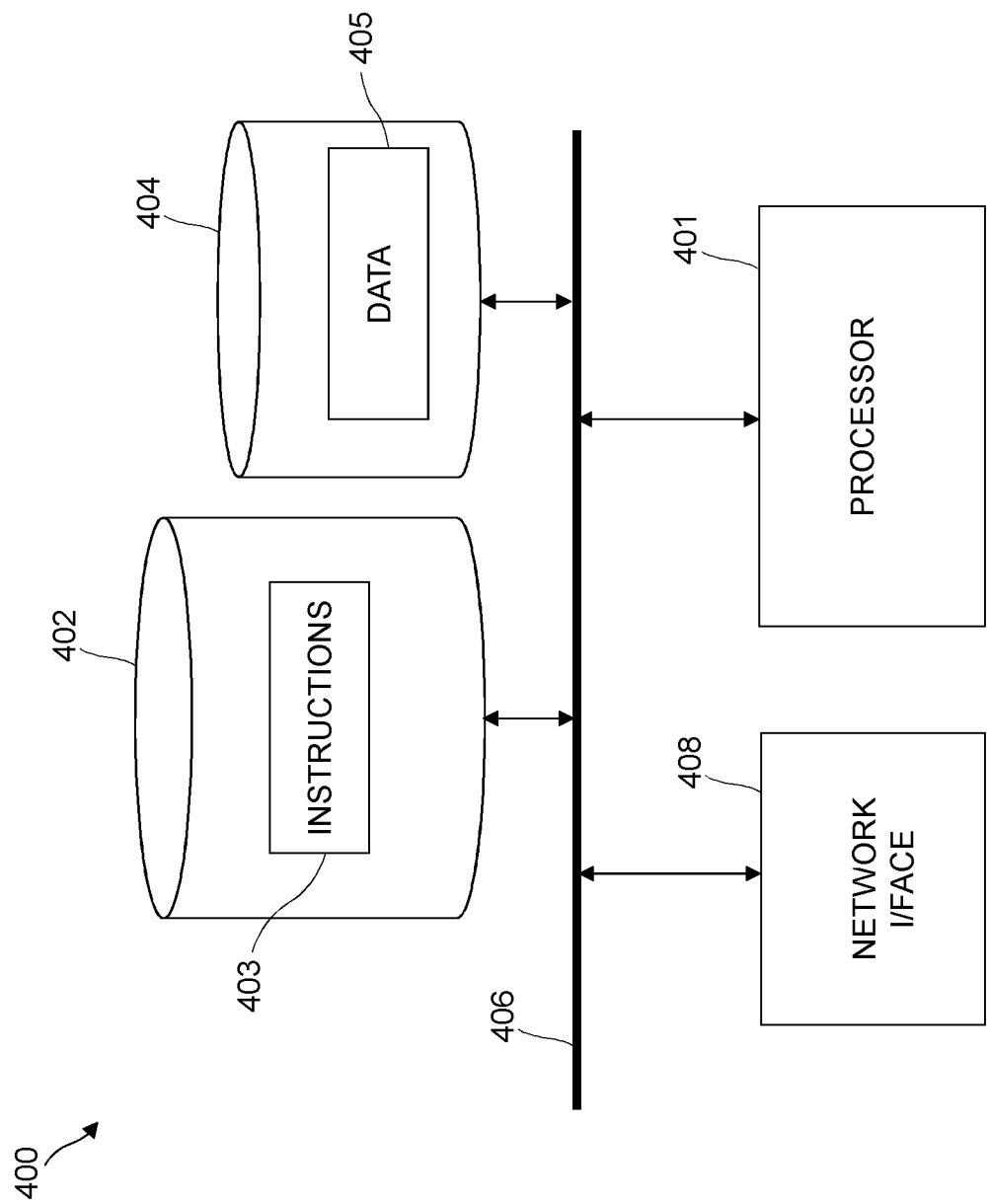
FIG. 11 shows apparatus for a computer-based implementation.

FIG. 11 shows an exemplary processing apparatus 400 which may be implemented as any form of a computing and/or electronic device, and in which embodiments of the system and methods described above may be implemented. Processing apparatus may implement all, or part of, the method shown in FIG. 3, 4 or 6. Processing apparatus 400 comprises one or more processors 401 which may be microprocessors, controllers or any other suitable type of processors for executing instructions to control the operation of the device. The processor 401 is connected to other components of the device via one or more buses 406. Processor-executable instructions 403 may be provided using any computer-readable media, such as memory 402. The processor-executable instructions 303 can comprise instructions for implementing the functionality of the described methods. The memory 402 is of any suitable type such as read-only memory (ROM), random access memory (RAM), a storage device of any type such as a magnetic or optical storage device. Additional memory 404 can be provided to store data 405 used by the processor 401. The processing apparatus 400 comprises one or more network interfaces 408 for interfacing with other network entities.

Figure 12:
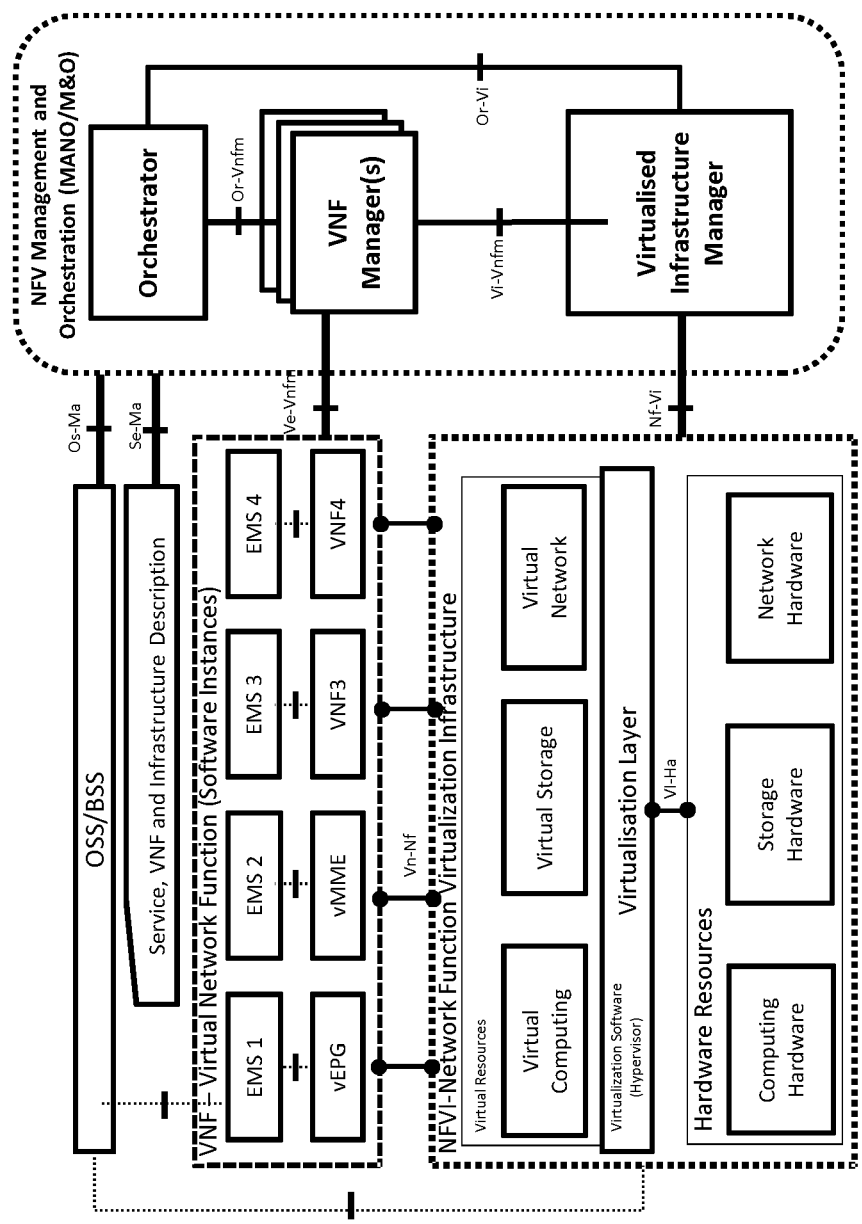
FIG. 12 shows an NFV architectural framework from ETSI document ETSI GS NFV 002.

For completeness, FIG. 12 shows an NFV architectural framework which appears as FIG. 4 in ETSI document ETSI GS NFV 002 v1.1.1 (October 2013), "Network Functions Virtualisation (NFV); Architectural Framework." The functions described in this specification can be implemented in an ETSI framework of this kind. For example, the NMS 10 shown in FIG. 2 can equate to the combination of OSS/BSS and NFV Management and Orchestration (MANO) blocks shown in FIG. 12. The communication between the NMS 10 and VNFs 51-53 of FIG. 2 can use information acquired via the interface Ve-Vnfm. The NMS 10 of FIG. 2 can use information acquired via the interface Os-Ma. The entities 40, 42, 45 can correspond to the NFV Management and Orchestration (MANO) block of FIG. 11.

Further Embodiments

A. An apparatus for operating a first virtual network function in a communications network, the apparatus comprising: means for activating the first virtual network function to operate in accordance with a configuration defined in a configuration file and means for determining when the first virtual network function is required to change from an active state to a sleep state. The apparatus further comprises means for storing a sleep state configuration file for the first virtual network function at a network management system; means for detecting a change of network conditions in the network and means for updating the sleep state configuration file of the first virtual network function in response to the detected change of network conditions while the first virtual network function is in the sleep state.

B. The apparatus as described in embodiment A, wherein the means for detecting a change of network conditions in the network is configured to detect a change to another virtual network function active in the network which impacts the configuration of the first virtual network function.

C. The apparatus as described in embodiment A or B wherein the means for detecting a change of network conditions in the network is configured to detect a change to a configuration of another virtual network function in the sleep state which impacts the configuration of the first virtual network function.

D. The apparatus as described in any one of embodiments A to C, wherein the means for detecting a change of network conditions in the network is further configured to:
detect a conflict between the configuration of the first virtual network function and another virtual network function;
resolve the conflict; and
perform the updating of the sleep state configuration file with a valid network configuration.

E. The apparatus as described in any one of embodiments A to D, wherein the means for storing is further configured to store a list of parameters which could impact the configuration of the first virtual network function; and the means for detecting is further configured to detect when a change occurs to one of the parameters in the list.

F. The apparatus as described in any one of embodiments A to E, wherein the configuration comprises at least one of:
a parameter value for the virtual network function; an IP address for the virtual network function.

G. The apparatus as described in any one of embodiments A to F, wherein determining when the first virtual network function in the network requires a change from an active state to a sleep state comprises receiving a notification from a virtual network function manager.

H. The apparatus as described in any one of embodiments A to G, wherein the means for determining is configured to determine when the first virtual network function is required to change from the sleep state to the active state; and the apparatus is configured to use a configuration file for the first virtual network function based on the updated sleep state configuration file.

I. The apparatus as described in embodiment H further comprising means for testing the updated sleep state configuration file, wherein the testing is carried out before using said updated sleep state configuration file with the first virtual network function.

J. The apparatus as described in embodiment H or I, wherein using a configuration file for the first virtual network function based on the updated sleep state configuration file occurs before the first virtual network function changes to the active state.

K. The apparatus as described in any one of embodiments A to J, wherein storing the sleep state configuration file at a network management system occurs before the first virtual network function changes to the sleep state.

L. The apparatus as described in any one of embodiments A to K, wherein the means for storing the sleep state configuration file of the first virtual network function at a network management system is further configured to:
store a copy of the configuration file of the first virtual network function at the network management system;
move the configuration file of the first virtual network function to a sleep state configuration store of the network management system.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of operating a first virtual network function in a communications network, the method comprising:
activating the first virtual network function to operate in accordance with a configuration defined in a configuration file;
determining when the first virtual network function is required to change from an active state to a sleep state;
storing a sleep state configuration file of the first virtual network function at a network management system;
detecting a change of network conditions in the communications network, wherein detecting the change of network conditions in the communications network comprises:
detecting a change in another virtual network function in the communications network; and
detecting a conflict between the configuration of the first virtual network function and a configuration of the other virtual network function; and
updating the sleep state configuration file of the first virtual network function in response to the detected change of network conditions while the first virtual network function is in the sleep state.

2. The method according to claim 1, wherein the other virtual network function is active in the communications network, and wherein the detected change of network conditions impacts the configuration of the first virtual network function.

3. The method according to claim 1, wherein detecting the change of network conditions in the communications network further comprises detecting a change in the configuration of the other virtual network function in the sleep state which impacts the configuration of the first virtual network function.

4. The method according to claim 1, wherein detecting the change of network conditions in the communications network further comprises:
resolving the conflict; and
performing the updating of the sleep state configuration file with a valid network configuration.

5. The method according to claim 1, further comprising:
storing a list of parameters which impact the configuration of the first virtual network function; and
detecting when a change occurs to one of the parameters in the list.

6. The method according to claim 1, wherein the configuration comprises at least one of:
a parameter value for the first virtual network function; and
an IP address for the first virtual network function.

7. The method according to claim 1, wherein determining when the first virtual network function in the communications network is required to change from the active state to the sleep state comprises receiving a notification from a virtual network function manager.

8. The method according to claim 1, further comprising:
determining when the first virtual network function is required to change from the sleep state to the active state; and using a configuration file for the first virtual network function based on the updated sleep state configuration file.

9. The method according to claim 8, further comprising: testing the updated sleep state configuration file before using the updated sleep state configuration file with the first virtual network function.

10. The method according to claim 8, wherein using the configuration file for the first virtual network function based on the updated sleep state configuration file occurs before the first virtual network function changes to the active state.

11. The method according to claim 1, wherein storing the sleep state configuration file of the first virtual network function at the network management system occurs before the first virtual network function changes to the sleep state.

12. The method according to claim 1, wherein storing the sleep state configuration file of the first virtual network function at the network management system comprises one of:
   storing a copy of the configuration file of the first virtual network function at the network management system; and
   moving the configuration file of the first virtual network function to a sleep state configuration store of the network management system.

13. An apparatus comprising a processor and a memory, the memory containing instructions executable by the processor, whereby the processor is operative to:
   activate a first virtual network function in a communications network to operate in accordance with a configuration defined in a configuration file;
   determine when the first virtual network function is required to change from an active state to a sleep state;
   store a sleep state configuration file of the first virtual network function at a network management system;
   detect a change of network conditions in the communications network, wherein to detect the change of network conditions in the communications network, the processor is operative to:
      detect a change in another virtual network function in the communications network; and
      detect a conflict between the configuration of the first virtual network function and a configuration of the other virtual network function; and
   update the sleep state configuration file of the first virtual network function in response to the detected change of network conditions while the first virtual network function is in the sleep state.

14. The apparatus according to claim 13, wherein the other virtual network function is active in the communications network, and wherein the detected change of network conditions impacts the configuration of the first virtual network function.

15. The apparatus according to claim 13, wherein to detect the change of network conditions in the communications network, the processor is further operative to detect a change in the configuration of the other virtual network function in the sleep state which impacts the configuration of the first virtual network function.

16. The apparatus according to claim 13, wherein to detect the change of network conditions in the communications network, the processor is further operative to:
   resolve the conflict; and
   perform the updating of the sleep state configuration file with a valid network configuration.

17. A computer program product comprising a non-transitory machine-readable medium carrying instructions which, when executed by a processor, cause the processor to:
   activate a first virtual network function in a communications network to operate in accordance with a configuration defined in a configuration file;
   determine when the first virtual network function is required to change from an active state to a sleep state;
   store a sleep state configuration file of the first virtual network function;
   detect a change of network conditions in the communications network, wherein to detect the change of network conditions in the communications network, the processor is operative to:
      detect a change in another virtual network function in the communications network; and
      detect a conflict between the configuration of the first virtual network function and a configuration of the other virtual network function; and
   update the sleep state configuration file of the first virtual network function in response to the detected change of network conditions while the first virtual network function is in the sleep state.

18. A communications network comprising an apparatus according to claim 13.

* * * * *